US012808674B2

(12) United States Patent
Beaurepaire et al.

(10) Patent No.: US 12,808,674 B2
(45) Date of Patent: Nov. 24, 2026

(54) METHODS AND APPARATUSES FOR PROVIDING TRIP PLAN BASED ON USER INTENT

(71) Applicant: HERE Global B.V., Eindhoven (NL)

(72) Inventors: Jerome Beaurepaire, Nantes (FR); Gianpietro Battistutti, Berlin (DE)

(73) Assignee: HERE Global B.V., Eindhoven (NL)

( * ) Notice: Subject to any disclaimer, the term of this patent is extended or adjusted under 35 U.S.C. 154(b) by 211 days.

(21) Appl. No.: 18/059,572

(22) Filed: Nov. 29, 2022

(65) Prior Publication Data

US 2024/0175691 A1 May 30, 2024

(51) Int. Cl.
*G01C 21/34* (2006.01)

(52) U.S. Cl.
CPC ..... *G01C 21/3407* (2013.01); *G01C 21/3484* (2013.01); *G01C 21/3492* (2013.01)

(58) Field of Classification Search
None
See application file for complete search history.

(56) References Cited

U.S. PATENT DOCUMENTS 10,839,467 B2 11/2020 Ghaddar et al.
2013/0006515 A1* 1/2013 Vellaikal ............... H04W 4/021 701/410
2015/0356623 A1 12/2015 Lee et al.
2020/0326194 A1* 10/2020 Wang ................. G01C 21/3484
2021/0142248 A1* 5/2021 Balva ..................... G08G 1/202
2021/0181929 A1 6/2021 Pan et al.
2023/0050118 A1* 2/2023 Papp .................. G01C 21/3476
2023/0236033 A1* 7/2023 Simoudis ........... G01C 21/3423 701/425

FOREIGN PATENT DOCUMENTS

CN 105868834 A * 8/2016 ............. G06Q 10/02
CN 112749339 A 5/2021
TW 202115662 A 4/2021

OTHER PUBLICATIONS

Halder, Sajal et al., "POI recommendation with queuing time and user interest awareness," Springer, Data Mining and Knowledge Discovery (2022) vol. 36, pp. 2379-2409 (Year: 2022).*

(Continued)

*Primary Examiner* — Madison R. Inserra
(74) *Attorney, Agent, or Firm* — Alston & Bird LLP

(57) ABSTRACT

An apparatus, for example, obtains a trip intent associated with a user; and causes a trip intent engine to determine a trip plan based at least in part on the trip intent using a trip intent model. The trip intent engine comprises the trip intent model, which is a machine learning-trained model. Determining the trip plan comprises identifying a destination based at least in part on point of interest data and the trip intent, determining a route from a current location of the user to the destination, determining a time for beginning a trip to the destination, and/or determining one or more modes of transportation for use in traversing one or more portions of the route. The apparatus causes at least a portion of the trip plan to be provided to the user via a user interface of a user apparatus.

20 Claims, 6 Drawing Sheets

(56) References Cited

OTHER PUBLICATIONS

Ho et al, "User Preferential Tour Recommendation Based on POI-Embedding Methods", 26th International Conference on Intelligent User Interfaces-Companion, arXiv:2103.02464v1, (Mar. 3, 2021), 5 pages.
Lim et al., "Personalized Trip Recommendation for Tourists Based on User Interests, Points of Interest Visit Durations and Visit Recency", Knowledge and Information Systems 54(2), (Feb. 2018), 30 pages.
Lu et al., "Personalized Trip Recommendation with Multiple Constraints by Mining User Check-In Behaviors", SIGSPATIAL '12: Proceedings of the 20th International Conference on Advances in Geographic Information Systems, (Nov. 2012), 10 pages.

* cited by examiner

METHODS AND APPARATUSES FOR PROVIDING TRIP PLAN BASED ON USER INTENT

TECHNOLOGICAL FIELD

An example embodiment relates generally to generating and providing destination, routing, timing, mode of transportation, and/or the like for a trip intended to be taken by a user to fulfill a user intent. An example embodiment relates generally to generating and providing trip plans based on user intent using a machine learning-trained trip intent model.

BACKGROUND

In an example scenario, a person may wish to buy a particular tool. The person may identify an establishment that sells the particular tool and go there to purchase the tool. However, the establishment identified by the person at which to purchase the tool, the timing of the trip, the route used for the trip, and/or the mode of transportation used may be far from optimal. This may lead to the person wasting time, money, fuel, and/or the like.

BRIEF SUMMARY OF VARIOUS EMBODIMENTS

Various embodiments provide methods, apparatuses, systems, computer program products, and/or the like for training a trip plan engine comprising a trip plan model using a machine learning technique and using the machine learning-trained trip plan model to generate and provide a trip plan based on a user intent. For example, the trip plan may include one or more of a destination for achieving the user intent, a route from an origin location to the destination, a timing for the trip (e.g., a time at which the trip should be begin), a mode of transportation for the trip, and/or the like. The trip plan and/or portions thereof are provided to a user (e.g., via a user apparatus) such that the user may achieve the user intent by way of the trip plan.

In various embodiments, the trip plan engine is trained to receive a user intent, access and/or obtain context information (weather data, traffic data, vehicle availability for one or more modes of transportation, parking availability for one or more modes of transportation at the destination, time of day, current season, and/or the like), access a point of interest (POI) database that includes information corresponding to various POIs, and based thereon, cause the trip plan model to determine a trip plan.

In various embodiments, the trip plan engine is configured and/or trained to make one or more reservations corresponding to the trip plan. For example, the trip plan engine may cause a reservation for a vehicle, a parking spot, an appointment, a seating reservation, and/or the like based on the trip plan (e.g., at a location/POI and/or time indicated by the trip plan).

In an example embodiment, an apparatus (e.g., a user apparatus and/or a network apparatus) obtains a trip intent associated with a user. The apparatus executes and/or operates a trip intent engine to cause the trip intent engine to determine a trip plan based at least in part on the trip intent using a trip intent model. The trip intent engine comprises the trip intent model that is a machine learning-trained model. Determining the trip plan includes at least one of identifying a destination based at least in part on point of interest data and the trip intent, determining a route from a current location of the user to the destination, determining a time for beginning a trip to the destination, or determining one or more modes of transportation for use in traversing one or more portions of the route. The apparatus causes at least a portion of the trip plan to be provided to the user via a user interface of a user apparatus.

In an example embodiment, at least one apparatus (e.g., a user apparatus and/or a network apparatus trains a trip intent model for use by a trip intent engine in determining one or more trip plans based on respective trip intents each associated with a respective user. The apparatus pre-trains the trip intent model with a machine learning training technique using group training data to generate a pre-trained trip intent model. The apparatus then trains the pre-trained trip intent model using user-specific training data to generate a user-specific trip intent model.

According to an aspect of the present disclosure, a method for generating and/or providing a trip plan based on a trip intent, and/or guiding a user to conduct a trip in accordance with the trip plan is provided. In various embodiments, the method is performed by an apparatus, such as a user apparatus or a network apparatus. In an example embodiment, the method comprises obtaining a trip intent associated with a user; and causing a trip intent engine to determine a trip plan based at least in part on the trip intent using a trip intent model. The trip intent engine comprises the trip intent model that is a machine learning-trained model. Determining the trip plan includes at least one of identifying a destination based at least in part on point of interest data and the trip intent, determining a route from a current location of the user to the destination, determining a time for beginning a trip to the destination, or determining one or more modes of transportation for use in traversing one or more portions of the route. The method further comprises causing at least a portion of the trip plan to be provided to the user via a user interface of a user apparatus.

In an example embodiment, the method further comprises obtaining the current location of the user, the current location determined based at least in part on a location sensor of the user apparatus.

In an example embodiment, the method further comprises obtaining context information, wherein the context information comprises one or more of traffic data, weather data, driving conditions data, vehicle availability for one or more modes of transportation, parking availability for one or more modes of transportation at the destination, reservation availability, a time of day, or a current season.

In an example embodiment, the trip intent engine is configured to determine the trip plan based at least in part on the context information.

In an example embodiment, the trip intent comprises one or more items, services, or experiences the user would like to obtain.

In an example embodiment, the trip intent model is at least one of a user-specific model, a location-specific model, or a user demographic-specific model.

In an example embodiment, the trip intent is determined based at least on user input received by the user apparatus.

In an example embodiment, the trip intent model determines the trip plan based at least in part on a database comprising point of interest data associated with intent data.

In an example embodiment, the method further comprises reserving at least one of a vehicle, a parking spot, or service based on the trip plan.

In an example embodiment, the method further comprises performing one or more navigation-related functions based at least in part on the trip plan.

In an example embodiment, the method further comprises receiving, storing, and/or providing (in a human perceivable or a machine/computer perceivable manner) credentials for accessing a reserved vehicle, parking spot, or service.

According to another aspect, an apparatus is provided. In an example embodiment, the apparatus comprises at least one processor and at least one memory storing computer program code. The at least one memory and the computer program code are configured to, with the processor, cause the apparatus to at least obtain a trip intent associated with a user; and cause a trip intent engine to determine a trip plan based at least in part on the trip intent using a trip intent model. The trip intent engine comprises the trip intent model that is a machine learning-trained model. Determining the trip plan includes at least one of identifying a destination based at least in part on point of interest data and the trip intent, determining a route from a current location of the user to the destination, determining a time for beginning a trip to the destination, or determining one or more modes of transportation for use in traversing one or more portions of the route. The at least one memory and the computer program code are further configured to, with the processor, cause the apparatus to at least cause at least a portion of the trip plan to be provided to the user via a user interface of a user apparatus.

In an example embodiment, the at least one memory and the computer program code are further configured to, with the processor, cause the apparatus to at least obtain the current location of the user, the current location determined based at least in part on a location sensor of the user apparatus.

In an example embodiment, the at least one memory and the computer program code are further configured to, with the processor, cause the apparatus to at least obtain context information, wherein the context information comprises one or more of traffic data, weather data, driving conditions data, vehicle availability for one or more modes of transportation, parking availability for one or more modes of transportation at the destination, reservation availability, a time of day, or a current season.

In an example embodiment, the trip intent engine is configured to determine the trip plan based at least in part on the context information.

In an example embodiment, the trip intent comprises one or more items, services, or experiences the user would like to obtain.

In an example embodiment, the trip intent model is at least one of a user-specific model, a location-specific model, or a user demographic-specific model.

In an example embodiment, the trip intent is determined based at least on user input received by the user apparatus.

In an example embodiment, the trip intent model determines the trip plan based at least in part on a database comprising point of interest data associated with intent data.

In an example embodiment, the at least one memory and the computer program code are further configured to, with the processor, cause the apparatus to at least reserve at least one of a vehicle, a parking spot, or service based on the trip plan.

In an example embodiment, the at least one memory and the computer program code are further configured to, with the processor, cause the apparatus to at least perform one or more navigation-related functions based at least in part on the trip plan.

In an example embodiment, the at least one memory and the computer program code are further configured to, with the processor, cause the apparatus to at least receive, store, and/or provide (in a human perceivable or a machine/computer perceivable manner) credentials for accessing a reserved vehicle, parking spot, or service.

According to still another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to obtain a trip intent associated with a user; and cause a trip intent engine to determine a trip plan based at least in part on the trip intent using a trip intent model. The trip intent engine comprises the trip intent model that is a machine learning-trained model. Determining the trip plan includes at least one of identifying a destination based at least in part on point of interest data and the trip intent, determining a route from a current location of the user to the destination, determining a time for beginning a trip to the destination, or determining one or more modes of transportation for use in traversing one or more portions of the route. The computer-readable program code portions comprise executable portions further configured, when executed by a processor of an apparatus, to cause the apparatus to cause at least a portion of the trip plan to be provided to the user via a user interface of a user apparatus.

In an example embodiment, the computer-readable program code portions comprise executable portions further configured, when executed by a processor of an apparatus, to cause the apparatus to obtain the current location of the user, the current location determined based at least in part on a location sensor of the user apparatus.

In an example embodiment, the computer-readable program code portions comprise executable portions further configured, when executed by a processor of an apparatus, to cause the apparatus to obtain context information, wherein the context information comprises one or more of traffic data, weather data, driving conditions data, vehicle availability for one or more modes of transportation, parking availability for one or more modes of transportation at the destination, reservation availability, a time of day, or a current season.

In an example embodiment, the trip intent engine is configured to determine the trip plan based at least in part on the context information.

In an example embodiment, the trip intent comprises one or more items, services, or experiences the user would like to obtain.

In an example embodiment, the trip intent model is at least one of a user-specific model, a location-specific model, or a user demographic-specific model.

In an example embodiment, the trip intent is determined based at least on user input received by the user apparatus.

In an example embodiment, the trip intent model determines the trip plan based at least in part on a database comprising point of interest data associated with intent data.

In an example embodiment, the computer-readable program code portions comprise executable portions further configured, when executed by a processor of an apparatus, to cause the apparatus to at least reserve at least one of a vehicle, a parking spot, or service based on the trip plan.

In an example embodiment, the computer-readable program code portions comprise executable portions further configured, when executed by a processor of an apparatus, to cause the apparatus to perform one or more navigation-related functions based at least in part on the trip plan.

In an example embodiment, the computer-readable program code portions comprise executable portions further configured, when executed by a processor of an apparatus, to cause the apparatus to receive, store, and/or provide (in a human perceivable or a machine/computer perceivable manner) credentials for accessing a reserved vehicle, parking spot, or service.

According to still another aspect of the present disclosure, an apparatus is provided. The apparatus comprises means for obtaining a trip intent associated with a user. The apparatus comprises means for causing a trip intent engine to determine a trip plan based at least in part on the trip intent using a trip intent model. The trip intent engine comprises the trip intent model that is a machine learning-trained model. Determining the trip plan includes at least one of identifying a destination based at least in part on point of interest data and the trip intent, determining a route from a current location of the user to the destination, determining a time for beginning a trip to the destination, or determining one or more modes of transportation for use in traversing one or more portions of the route. The apparatus comprises means for causing at least a portion of the trip plan to be provided to the user via a user interface of a user apparatus.

According to another aspect, a method for training a trip intent model for use by a trip intent engine for determining one or more trip plans based on respective trip intents is provided. In an example embodiment, the method comprises pre-training the trip intent model with a machine learning training technique using group training data to generate a pre-trained trip intent model; and training the pre-trained trip intent model using user-specific data to generate a user-specific trip intent model.

In an example embodiment, at least one of the pre-trained trip intent model or the user-specific trip intent model is stored in the form of one or more tables of features.

According to another aspect, an apparatus is provided. In an example embodiment, the apparatus comprises at least one processor and at least one memory storing computer program code. The at least one memory and the computer program code are configured to, with the processor, cause the apparatus to at least pre-train the trip intent model with a machine learning training technique using group training data to generate a pre-trained trip intent model; and train the pre-trained trip intent model using user-specific data to generate a user-specific trip intent model.

In an example embodiment, at least one of the pre-trained trip intent model or the user-specific trip intent model is stored in the form of one or more tables of features.

According to still another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to pre-train the trip intent model with a machine learning training technique using group training data to generate a pre-trained trip intent model; and train the pre-trained trip intent model using user-specific data to generate a user-specific trip intent model.

In an example embodiment, at least one of the pre-trained trip intent model or the user-specific trip intent model is stored in the form of one or more tables of features.

According to yet another aspect, an apparatus is provided. In an example embodiment, the apparatus comprises means for pre-training the trip intent model with a machine learning training technique using group training data to generate a pre-trained trip intent model. The apparatus comprises means for training the pre-trained trip intent model using user-specific data to generate a user-specific trip intent model.

BRIEF DESCRIPTION OF THE DRAWINGS

Figure 1:
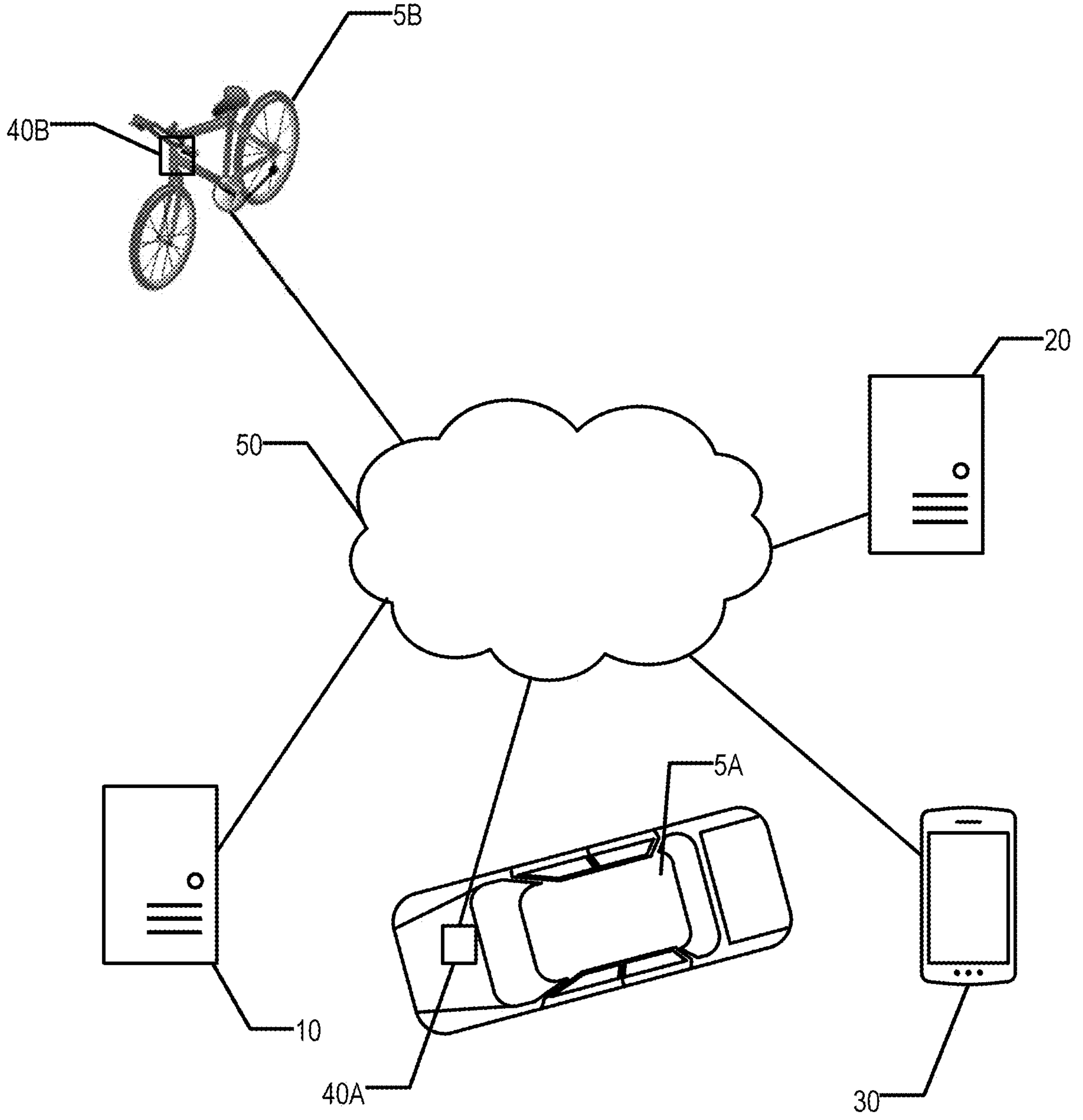
Figure 2A:
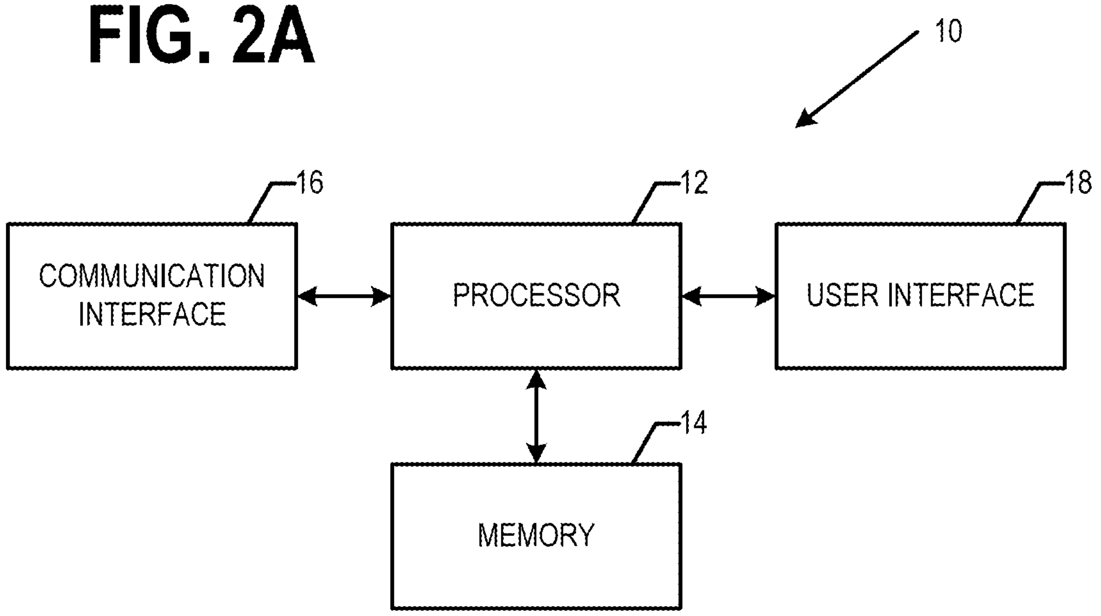
Figure 2B:
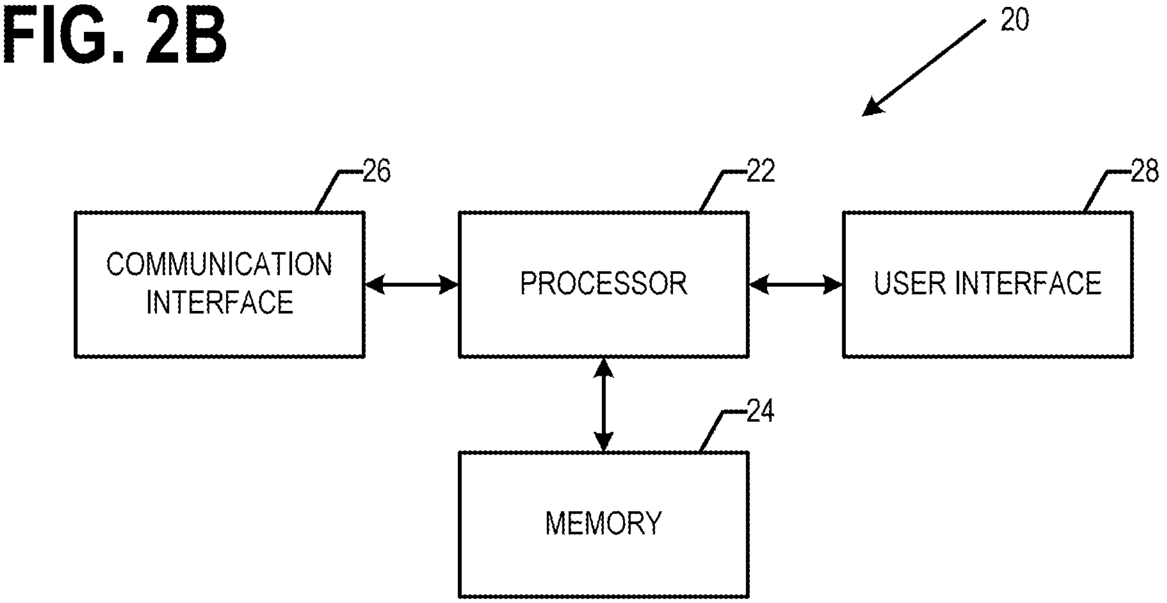
Figure 2C:
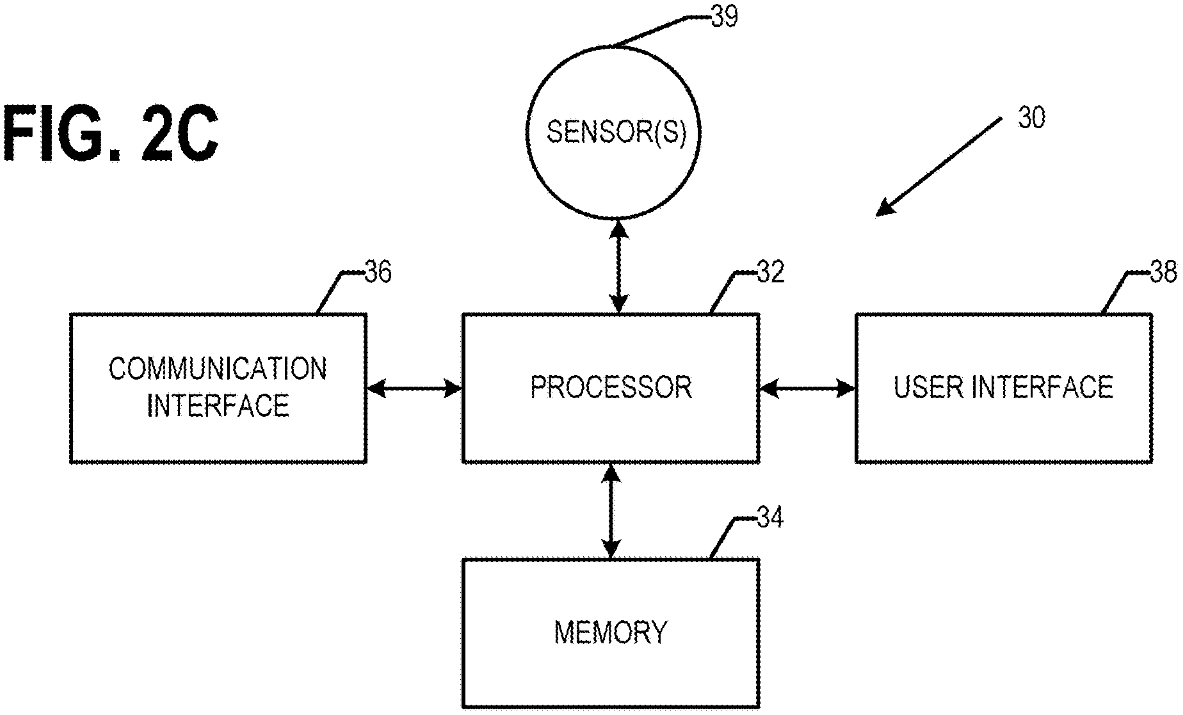
Figure 3:
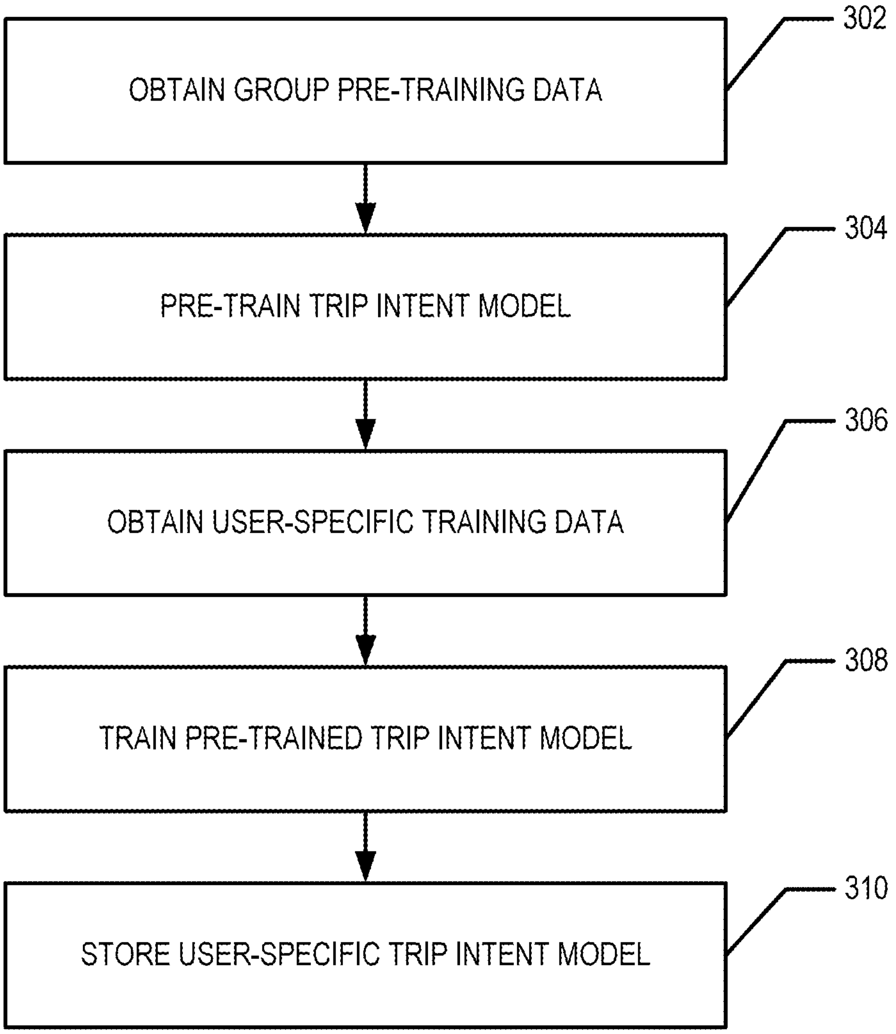
Figure 4:
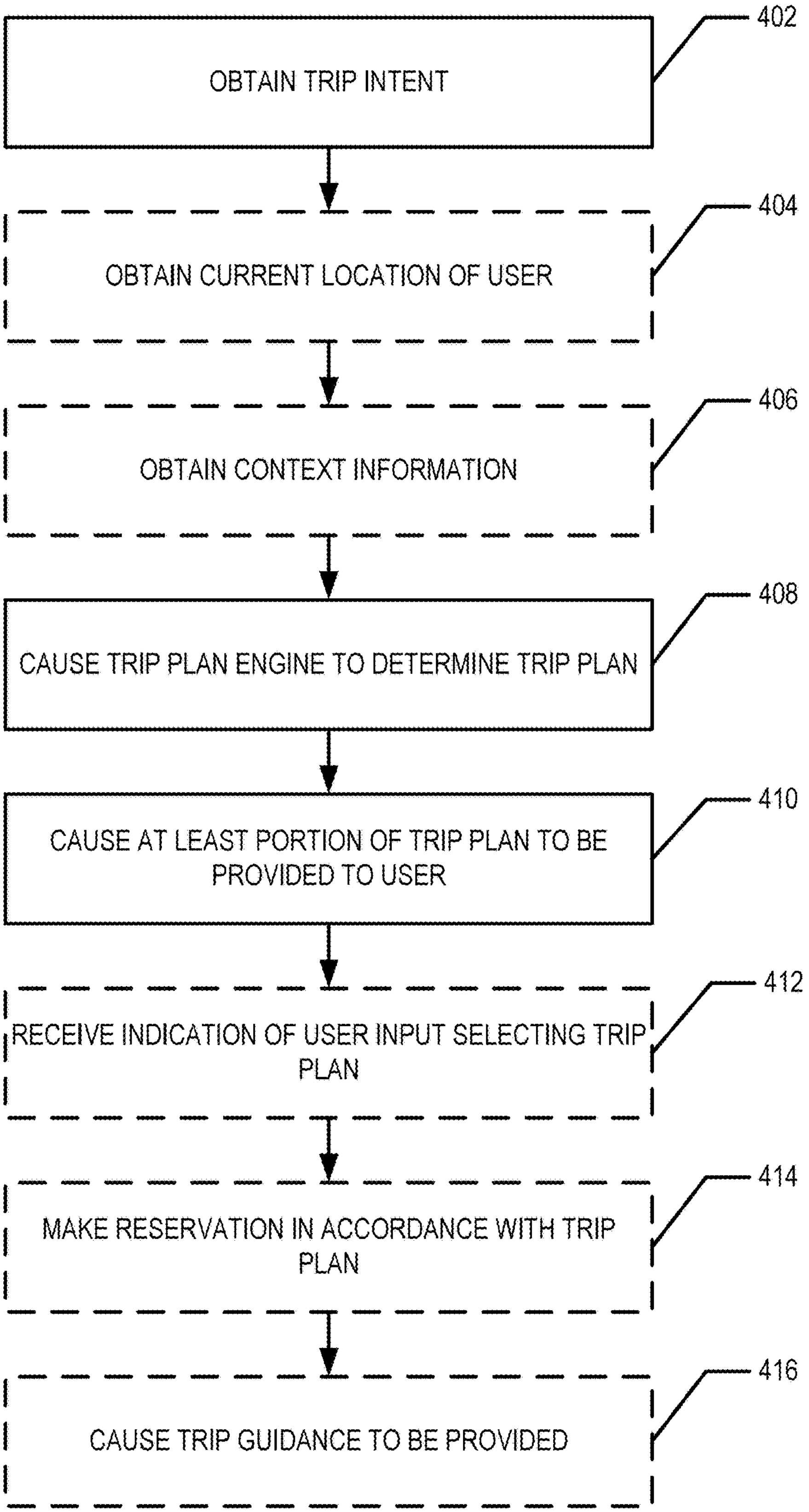

Having thus described certain example embodiments in general terms, reference will hereinafter be made to the accompanying drawings, which are not necessarily drawn to scale, and wherein:

FIG. 1 is a block diagram showing an example architecture of one exemplary embodiment;

FIG. 2A is a block diagram of a network apparatus that may be specifically configured in accordance with an example embodiment;

FIG. 2B is a block diagram of a context apparatus that may be specifically configured in accordance with an example embodiment;

FIG. 2C is a block diagram of a user apparatus that may be specifically configured in accordance with an example embodiment;

FIG. 3 is a flowchart illustrating an overview of operations performed, such as by the network apparatus of FIG. 2A, to train a trip plan model of a trip plan engine, in accordance with an example embodiment; and FIG. 4 is a flowchart illustrating operations performed, such as by the network apparatus of FIG. 2A and/or the user apparatus of FIG. 2C, to generate and provide a trip plan using a trip plan engine, in accordance with an example embodiment.

DETAILED DESCRIPTION OF SOME EXAMPLE EMBODIMENTS

I. General Overview

Various embodiments provide methods, apparatuses, systems, computer program products, and/or the like for training a trip plan engine comprising a trip plan model using a machine learning technique and using the machine learning-trained trip plan model to generate and provide a trip plan based on a user intent. For example, the trip plan may include one or more of a destination for achieving the user intent, a route from an origin location to the destination, a timing for the trip (e.g., a time at which the trip should be begin), a mode of transportation for the trip, and/or the like. The trip plan and/or portions thereof are provided to a user (e.g., via a user apparatus) such that the user may achieve the user intent by way of the trip plan.

In various embodiments, the trip plan engine is trained to receive a user intent, access and/or obtain context information (weather data, traffic data, vehicle availability for one or more modes of transportation, parking availability for one or more modes of transportation at the destination, time of day, current season, and/or the like), access a point of interest (POI) database that includes information corresponding to various POIs, and based thereon, cause the trip plan model to determine a trip plan.

In various embodiments, the trip plan engine is configured and/or trained to make one or more reservations corresponding to the trip plan. For example, the trip plan engine may cause a reservation for a vehicle, a parking spot, an appointment, a seating reservation, and/or the like based on the trip plan (e.g., at a location/POI and/or time indicated by the trip plan).

In various embodiments, a trip intent is a particular item, service, or experience (or plurality of items, services, and/or experiences) a user wishes to obtain on a trip. For example, a user may wish to purchase one or more items such as particular tools, groceries, household items, a birthday present, and/or the like. In an other example, a user may wish to get their personal vehicle detailed, get their haircut, attend a healthcare appointment, get a massage, go to a particular type of restaurant, watch a movie, and/or the like.

A user may provide input to a user apparatus to indicate a trip intent. The user apparatus may receive the trip intent and execute a trip plan engine or provide the trip intent to a network apparatus executing a trip plan engine. The user apparatus and/or the network apparatus executes the trip plan engine to generate and/or determine a trip plan based on the trip intent. The trip plan engine may also use information stored in a POI database and/or context information to generate and/or determine the trip plan. In various embodiments, the context information comprises traffic data (current and/or historical traffic data), map data (e.g., describing a traversable road network, traversable pedestrian/bike trail/path network, and/or the like), weather data (current and/or predicted), driving conditions data (e.g., visibility, road surface status, and/or the like), vehicle availability for one or more modes of transportation, parking availability for one or more modes of transportation at the destination, reservation availability for one or more POIs, and/or the like.

The trip plan engine comprises a machine learning-trained trip plan model. The trip plan model is trained to use the trip intent, POI database, and/or context information to determine and/or generate at least a portion of a trip plan. In various embodiments the trip plan comprises a destination for the trip, a route to the destination (e.g., starting from a user's current location or other origin location), timing information for the trip (e.g., a time for beginning the trip), one or more modes of transportation for use in traversing one or more portions of the route, and/or the like. In various embodiments, the trip plan further comprises a reservation plan. For example, the reservation plan may include a plan for a reservation for a vehicle (e.g., bicycle, cargo bicycle, passenger car, van, pick-up truck, moving truck, train, bus, and/or the like), a parking spot near the destination, an appointment for fulfilling the trip intent at the destination, and/or the like.

In various embodiments, the network apparatus and/or user apparatus causes at least a portion of the trip plan to be provided via a user interface of the user apparatus. In various embodiments, in response to a user providing user input authorizing the reservation plan or based on a default setting, the user apparatus and/or network apparatus may cause one or more reservations to be made based on the reservation plan. For example, the network apparatus and/or user apparatus may cause a reservation for a vehicle of a particular mode of transportation to be made, a parking spot reservation to be made, an appointment for fulfilling the trip intent at the destination, and/or the like.

In various embodiments, the user apparatus provides guidance to a user such that the user may conduct the trip in accordance with the trip plan. For example, the user apparatus may provide a notification to a user when it is time for the user to begin the trip, provide route guidance for the user to traverse the route of the trip plan, provide guidance for a user to access and/or make use of one or more reservations of the trip plan, and/or the like. For example, the user apparatus, via a user interface thereof, provides information to the user such that the user may conduct the trip to accomplish the trip intent in accordance with the trip plan.

Conventional navigation aids are able to provide a user with a route from an origin location to a destination location. However, a user must already know the destination location and determine when and how to conduct the trip. However, the destination, the timing of the trip, and/or the mode of transportation used may be far from optimal. This may lead to the user wasting time, money, fuel, and/or the like. Therefore, a technical problem exists regarding the lack of ability to determine and/or generate a trip plan for accomplishing one or more user goals.

Various embodiments provide technical solutions to these technical problems. In particular, a trip plan engine comprising a machine learning-trained trip plan model is configured to identify a destination, determine a route, determine a mode of transportation, determine travel timing, and/or the like based on a trip intent, user preferences and/or historical behavior, a POI database, and/or context information. Moreover, the trip plan engine may generate a reservation plan based on the trip plan which is configured to enable the user to conduct the trip in the planned manner. Thus, various embodiments provide an improved user experience and improvements to the technical field of navigation-related technologies, such as trip planning.

II. Example System Architecture

FIG. 1 provides an illustration of an example system that can be used in conjunction with various embodiments of the present invention. As shown in FIG. 1, the system may include one or more network apparatuses 10, one or more context apparatuses 20, one or more user apparatuses 30, one or more reservation apparatuses 40 (e.g., 40A, 40B), some of which are disposed on respective vehicles 5 (e.g., 5A, 5B), one or more networks 50, and/or the like.

In various embodiments, the network apparatus 10 is a server, server bank, part of a cloud-based computing environment, and/or the like. In various embodiments, the network apparatus 10 is configured to train a trip plan engine and/or a trip plan model of a trip plan engine. In various embodiments, the network apparatus 10 is configured to execute and/or operate a trip plan engine to cause the trip plan model to generate and provide a trip plan based on a received and/or obtained user intent. In various embodiments, the network apparatus 10 is in communication with one or more context apparatuses 20, one or more user apparatuses 30, one or more reservation apparatuses 40, and/or other computing entities via one or more wired and/or wireless networks 50.

In various embodiments, a context apparatus 20 is configured to store and/or provide context information. For example, a context apparatus 20 may store and/or provide traffic data (current and/or historical traffic data), map data (e.g., describing a traversable road network, traversable pedestrian/bike trail network, and/or the like), weather data (current and/or predicted), driving conditions data (e.g., visibility, road surface status, and/or the like), vehicle availability for one or more modes of transportation, parking availability for one or more modes of transportation at the destination, reservation availability for one or more POIs, and/or the like. In various embodiments, the context apparatus 20 is a server, group of servers, cloud-based service, and/or the like. In various embodiments, the context apparatus 20 is configured to communicate with a network apparatus 10 and/or one or more user apparatuses 30, for example, via one or more wired and/or wireless networks 50. In various embodiments, a context apparatus 20 is a computing entity operated by and/or on behalf of a weather service, traffic service, reservable service provider (e.g., a service that allows one to reserve a shared vehicle, parking spot, and/or the like), and/or other service.

In various embodiments, the user apparatus 30 may be a mobile phone, tablet, in vehicle navigation system, vehicle control system, other mobile computing device, desktop computer, laptop, and/or the like. In various embodiments, a user apparatus 30 is configured to receive user input (e.g., via a user interface thereof) providing a user intent. In various embodiments, the user apparatus 30 is configured to provide the user intent to a network apparatus 10 and/or a locally stored and/or operated trip plan engine. In various embodiments, the user apparatus 30 receives a trip plan (e.g., provided by a network apparatus 10 and/or a locally stored and/or operated trip plan engine) and provides at least a portion of the trip plan in a human perceivable format via a user interface of the user apparatus 30 (e.g., audibly via speakers and/or visually via a display). In various embodiments, the user apparatus 30 is configured to provide trip guidance (e.g., provide directions for traversing a route for the trip, provide guidance regarding making use of one or more reservations for the trip, and/or the like). In an example embodiment, the user apparatus 30 is configured to communicate with one or more reservation apparatuses to assist a user in making use of one or more reservations for the trip.

In various embodiments, a reservation apparatus 40 is associated with a reservable item or service. For example, reservation apparatus 40A is onboard vehicle 5A (e.g., an automobile) and reservation apparatus 40B is onboard vehicle 5B (e.g., a bicycle). In various embodiments, the reservation apparatus 40 is configured to communicate with a network apparatus 10, context apparatus 20, and/or user apparatus 30 such that a reservation for the item or service associated with the reservation apparatus may be made and used by a user, in accordance with a trip plan. For example, the reservation apparatus 40 is a mobile computing device configured to control access to the associated item or service. For example, the reservation apparatus 40 is configured to allow access to the associated item or service to a user having appropriate credentials (e.g., a correct password, code, reservation id, and/or the like).

In an example embodiment, a network apparatus 10 may comprise components similar to those shown in the example network apparatus 10 diagrammed in FIG. 2A. In an example embodiment, the network apparatus 10 is configured to receive and analyze a plurality of instances of trip data, pre-train and/or train a trip intent model, execute and/or operate a trip intent model to generate and/or determine a trip plan based on a trip intent and context information, provide at least a portion of a trip plan, make one or more reservations in accordance with the trip plan, and/or the like. For example, as shown in FIG. 2A, the network apparatus 10 may comprise a processor 12, memory 14, a user interface 18, a communication interface 16, and/or other components configured to perform various operations, procedures, functions or the like described herein. In at least some example embodiments, the memory 14 is non-transitory.

In an example embodiment, a context apparatus 20 may comprise components similar to those shown in the example context apparatus 20 diagrammed in FIG. 2B. In an example embodiment, the context apparatus 20 is configured to store and/or provide context information such as traffic data (current and/or historical traffic data), map data (e.g., describing a traversable road network, traversable pedestrian/bike trail network, and/or the like), weather data (current and/or predicted), driving conditions data (e.g., visibility, road surface status, and/or the like), vehicle availability for one or more modes of transportation, parking availability for one or more modes of transportation at the destination, reservation availability for one or more POIs, and/or the like. For example, as shown in FIG. 2B, the context apparatus 20 may comprise a processor 22, memory 24, a user interface 28, a communication interface 26, and/or other components configured to perform various operations, procedures, functions or the like described herein. In at least some example embodiments, the memory 24 is non-transitory.

In an example embodiment, a user apparatus 30 is configured to provide navigation and/or route information/data to a user. In an example embodiment, the user apparatus 30 may be configured to autonomously drive a vehicle 5 and/or assist in control of a vehicle 5 (e.g., an ADAS) in accordance with navigation and/or route information/data. In an example embodiment, the user apparatus 30 may be configured to generate and/or receive a trip plan, provide at least a portion of a trip plan perform one or more navigation-related functions based on and/or using the trip plan, and/or the like.

In an example embodiment, as shown in FIG. 2C, the user apparatus 30 may comprise a processor 32, memory 34, a communication interface 36, a user interface 38, one or more sensors 39 (e.g., a location sensor such as a GNSS sensor; IMU sensors; camera(s); radio sensors/interfaces, and/or the like), and/or other components configured to perform various operations, procedures, functions or the like described herein. In at least some example embodiments, the memory 34 is non-transitory.

In various embodiments, a reservation apparatus 40 comprises one or more components similar to those of a user apparatus 30. For example, a reservation apparatus 40 comprises a processor, memory, a user interface, a communication interface, one or more sensors (e.g., location sensors, radio sensors/interfaces, and/or the like) and/or other components configured to perform various operations, procedures, functions or the like described herein, in various embodiments.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), 5G, cellular network, and/or the like. In some embodiments, a network 50 may comprise the automotive cloud, digital transportation infrastructure (DTI), radio data system (RDS)/high definition (HD) radio or other digital radio system, and/or the like. For example, a user apparatus 30 and/or context apparatus 20 may be in communication with a network apparatus 10 via the network 50. For example, a user apparatus 30 may communicate with the network apparatus 10 via a network, such as the Cloud. For example, the Cloud may be a computer network that provides shared computer processing resources and data to computers and other devices connected thereto. In various embodiments, a reservation apparatus 40 may communicate with the network apparatus 10 and/or a context apparatus 20 via a network, such as the Cloud.

Certain example embodiments of the network apparatus 10, context apparatus 20, and the user apparatus 30 are described in more detail below with respect to FIGS. 2A, 2B, and 2C.

III. Exemplary Operation of an Example Embodiment

Various embodiments provide methods, apparatuses, systems, computer program products, and/or the like for training a trip plan engine comprising a trip plan model using a machine learning technique and using the machine learning-trained trip plan model to generate and provide a trip plan based on a user intent. For example, the trip plan may include one or more of a destination for achieving the user intent, a route from an origin location to the destination, a timing for the trip (e.g., a time at which the trip should be begin), a mode of transportation for the trip, and/or the like. The trip plan and/or portions thereof are provided to a user (e.g., via a user apparatus) such that the user may achieve the user intent by way of the trip plan.

In various embodiments, the trip plan engine is trained, by a network apparatus 10, to receive a user intent, access and/or obtain context information (weather data, traffic data, vehicle availability for one or more modes of transportation, parking availability for one or more modes of transportation at the destination, time of day, current season, and/or the like), access a point of interest (POI) database that includes information corresponding to various POIs, and based thereon, cause the trip plan model to determine a trip plan.

In various embodiments, the trip plan engine comprises a trip plan model that is specific to a particular user, specific to a particular location (e.g., geographical region or area), and/or specific to a particular user demographic. For example, in an example embodiment, the trip plan model is pre-trained using training data collected based on a group of user's preferences and/or user behaviors. The group of users may be located within the same geographical region or area and/or may have similar demographics, in an example embodiment. In an example embodiment, the trip plan model is then further trained for a particular user based on training data corresponding to the particular user's preferences and behaviors.

In various embodiments, the trip plan engine is configured and/or trained to make one or more reservations corresponding to the trip plan. For example, the trip plan engine may cause a reservation for a vehicle, a parking spot, an appointment, a seating reservation, and/or the like based on the trip plan (e.g., at a location/POI and/or time indicated by the trip plan).

In various embodiments, a trip intent is a particular item, service, or experience (or plurality of items, services, and/or experiences) a user wishes to obtain on a trip. For example, a user may wish to purchase one or more items such as particular tools, groceries, household items, a birthday present, and/or the like. In another example, a user may wish to get their personal vehicle detailed, get their haircut, attend a healthcare appointment, get a massage, go to a particular type of restaurant, watch a movie, and/or the like.

A user may provide input to a user apparatus 30 to indicate a trip intent. The user apparatus 30 may receive the trip intent via a user interface 38 thereof and execute a trip plan engine or provide the trip intent to a network apparatus 10 executing a trip plan engine. The user apparatus 30 and/or the network apparatus 10 executes the trip plan engine to generate and/or determine a trip plan based on the trip intent. The trip plan engine may also use information stored (e.g., in memory 14, 34) in a POI database and/or context information to generate and/or determine the trip plan.

In various embodiments, the context information is requested and/or received from one or more context apparatuses 20. In various embodiments, the context information comprises traffic data (current and/or historical traffic data), map data (e.g., describing a traversable road network, traversable pedestrian/bike trail/path network, and/or the like), weather data (current and/or predicted), driving conditions data (e.g., visibility, road surface status, and/or the like), vehicle availability for one or more modes of transportation, parking availability for one or more modes of transportation at the destination, reservation availability for one or more POIs, and/or the like.

The trip plan engine comprises a machine learning-trained trip plan model. The trip plan model is trained to, when executed by processors 12, 32 of the network apparatus 10 and/or user apparatus 30, use the trip intent, POI database, and/or context information to determine and/or generate at least a portion of a trip plan. In various embodiments the trip plan comprises a destination for the trip, a route to the destination (e.g., starting from a user's current location or other origin location), timing information for the trip (e.g., a time for beginning the trip), one or more modes of transportation for use in traversing one or more portions of the route, and/or the like. In various embodiments, the trip plan further comprises a reservation plan. For example, the reservation plan may include a plan for a reservation for a vehicle (e.g., bicycle, cargo bicycle, passenger car, van, pick-up truck, moving truck, train, bus, and/or the like), a parking spot near the destination, an appointment for fulfilling the trip intent at the destination, and/or the like.

In various embodiments, the network apparatus 10 and/or user apparatus 30 causes at least a portion of the trip plan to be provided via a user interface 38 of the user apparatus. In various embodiments, in response to a user providing user input authorizing the reservation plan (e.g., via interaction with the user interface 38) or based on a default setting associated with the user, the user apparatus 30 and/or network apparatus 10 may cause one or more reservations to be made based on the reservation plan. For example, the network apparatus and/or user apparatus may cause a reservation for a vehicle of a particular mode of transportation to be made, a parking spot reservation to be made, an appointment for fulfilling the trip intent at the destination, and/or the like. For example, what is reserved, the location at which the reservation is made, and the timing of the reservation is provided by the reservation plan.

In various embodiments, the user apparatus 30 provides guidance (e.g., via user interface 38) to a user such that the user may conduct the trip in accordance with the trip plan. For example, the user apparatus 30 may provide a notification to a user when it is time for the user to begin the trip, provide route guidance for the user to traverse the route of the trip plan, provide guidance for a user to access and/or make use of one or more reservations of the trip plan, and/or the like. For example, the user apparatus 30, via the user interface 38 thereof, provides information to the user such that the user may conduct the trip to accomplish the trip intent in accordance with the trip plan.

A. Example Training of a Trip Plan Engine

In various embodiments, a trip plan engine is trained by a network apparatus 10. In various embodiments, the trip plan engine comprises a trip plan model that is trained using machine learning techniques. For example, the trip plan model is trained using a supervised or semi-supervised technique, in various embodiments.

In various embodiments, the result of training the trip plan model is one or more multi-feature tables that may be used to determine one or more aspects of a trip plan. For example, the one or more multi-feature tables may include a table corresponding to a particular season of the year, and values or ranges of various aspects of context information that, when satisfied, a user prefers to use a first mode of transportation. For example, during spring, when the temperature is above 12° C., the likelihood of rain during a trip is below 30%, and the round trip distance of the trip is less than 10 km, the user prefers to use a bicycle (as long as any items obtained during the trip are appropriate for the cargo volume of a bicycle or back pack). However, under other circumstances (e.g., temperature below 12° C., the likelihood of rain during a trip is above 30%, and/or the round trip distance of the trip is greater than 10 km) the user would prefer to use a car or public transportation (e.g., a train or bus). In various embodiments, the trip plan model may take various forms other than that of one or more multi-feature tables.

In various embodiments, the trip plan model user-specific, location-specific (e.g., specific to a particular geographical region or area), and/or demographic-specific. For example, in various embodiments, the trip plan model is pre-trained using group training data. For example, the group training data may correspond to trips taken by a plurality of users (e.g., a group of users) that are located in a particular geographical region or area and/or that have similar demographics. The trip plan model may then be trained (e.g., further refined) using training data that is user-specific (e.g., corresponds to trip taken by a particular user) or that is group training data.

FIG. 3 provides a flowchart illustrating various processes, procedures, operations, and/or the like performed by a network apparatus 10 to train a user-specific trip intent model. As should be understood, in various embodiments, a user apparatus 30 may train a trip intent model in a similar manner.

Starting at block 302, group pre-training data is obtained. For example, the network apparatus 10 obtains group pre-training data. For example, the network apparatus 10 comprises processors 12, memory 14, communication interface 16, and/or user interface 18, for obtaining group pre-training data.

For example, one or more user apparatuses 30 may determine information regarding trips taken by corresponding users. For example, a user apparatus 30 may determine a POI visited by a corresponding user, a route taken by the user to get to and/or from the POI, a mode of transportation taken by the user, and/or other information corresponding to the trip taken by the user. For example, the sensors 39 of the user apparatus 30 may capture sensor data used to the determine a POI visited by a corresponding user, a route taken by the user to get to and/or from the POI, a mode of transportation taken by the user, how scenic the route taken is, a determined intent of the trip, and/or other information corresponding to the trip taken by the user. In various embodiments, the mode of transportation taken by the user is determined based on one or more of maximum and/or average speed of the user apparatus 30 during the trip, a portion of a traversable network traversed by the user apparatus 30 during the trip (e.g., if a bike path is used, the user likely was not driving a vehicle; if a portion of the trip corresponds to a subway rail line, it is likely the user took the subway), and/or one or more apparatuses observed by the user apparatus 30 during the trip (e.g., if the user apparatus 30 was connected via Bluetooth™ to a vehicle, the user likely took a vehicle; if the user apparatus 30 observed a Wi-Fi™ access point that is disposed on a public transportation bus for an extended period of time (e.g., three minutes or more), it is likely the user took a bus), and/or the like. In an example embodiment, when it is determined that the user used a vehicle to conduct the trip, the amount of time the user spends looking for parking at the destination may be determined and included trip information. In an example embodiment, the determined intent of the trip is determined based at least in part on POI information for the destination. For example, if the destination of the trip is a coffee shop, it may be determined that the trip intent was to obtain coffee or to join a friend for coffee. If the destination of the trip is a grocers, it may be determined that the trip intent was to get groceries.

For example, in an example embodiment, the user apparatus 30 may determine context information corresponding to the trip taken by the user (e.g., weather conditions, traffic conditions, and/or the like). The context information may be determined by one or more sensors 39 of the user apparatus 30 and/or requested and/or received from a context apparatus 20.

The user apparatus 30 may provide (e.g., via communication interface 36) the information regarding the trip such that the network apparatus 10 receives the information regarding the trip (e.g., via communication interface 16) and stores the information regarding the trip in a data store (e.g., database and/or the like in memory 14). The network apparatus 10 may then compile information regarding a plurality of trips (possibly taken by a plurality of users and reported by a plurality of user apparatuses 30) into group pre-training data. In various embodiments, the group pre-training data is formatted as labeled training data.

At block 304, the network apparatus 10 pre-trains the trip plan model using the group pre-training data. For example, the network apparatus 10 comprises means, such as processor 12, memory 14, and/or the like, for pre-training the trip plan model using the group pre-training data. In various embodiments, the trip plan model is trained using various artificial neural network (ANN), deep neural network (DNN), convolutional neural network (CNN), generative adversarial network (GAN), Bayesian classifier, clustering classifier, and/or other machine learning-trained model architectures and corresponding training techniques. In various embodiments, the trip plan model is pre-trained to a desired level of convergence, maximum number of training iterations, and/or the like.

In various embodiments, once the trip plan model is pre-trained, the trip plan model may be used to generate and/or determine trip plans. For example, the trip plan model may be used (e.g., by a trip plan engine operating on a network apparatus 10 and/or user apparatus 30) while user-specific trip data is obtained and the user-specific trip plan model is trained.

At block 306, user-specific trip data is obtained. For example, the network apparatus 10 obtains group pre-training data. For example, the network apparatus 10 comprises processors 12, memory 14, communication interface 16, and/or user interface 18, for obtaining group pre-training data.

For example, one or more user apparatuses 30 corresponding to a user may determine information regarding trips taken by the corresponding user. For example, the user apparatus 30 may determine a POI visited by the corresponding user, a route taken by the user to get to and/or from the POI, a mode of transportation taken by the user, and/or other information corresponding to the trip taken by the user. For example, the sensors 39 of the user apparatus 30 may capture sensor data used to the determine a POI visited by a corresponding user, a route taken by the user to get to and/or from the POI, a mode of transportation taken by the user, how scenic the route taken is, a determined intent of the trip, and/or other information corresponding to the trip taken by the user.

In various embodiments, the mode of transportation taken by the user is determined based on one or more of maximum and/or average speed of the user apparatus 30 during the trip, a portion of a traversable network traversed by the user apparatus 30 during the trip (e.g., if a bike path is used, the user likely was not driving a vehicle; if a portion of the trip corresponds to a subway rail line, it is likely the user took the subway), and/or one or more apparatuses observed by the user apparatus 30 during the trip (e.g., if the user apparatus 30 was connected via Bluetooth™ to a vehicle, the user likely took a vehicle; if the user apparatus 30 observed a Wi-Fi™ access point that is disposed on a public transportation bus for an extended period of time (e.g., three minutes or more), it is likely the user took a bus), and/or the like. In an example embodiment, when it is determined that the user used a vehicle to conduct the trip, the amount of time the user spends looking for parking at the destination may be determined and included trip information.

In an example embodiment, the determined intent of the trip is determined based at least in part on POI information for the destination. For example, if the destination of the trip is a coffee shop, it may be determined that the trip intent was to obtain coffee or to join a friend for coffee. If the destination of the trip is a grocers, it may be determined that the trip intent was to get groceries.

For example, in an example embodiment, the user apparatus 30 may determine context information corresponding to the trip taken by the user (e.g., weather conditions, traffic conditions, and/or the like). The context information may be determined by one or more sensors 39 of the user apparatus 30 and/or requested and/or received from a context apparatus 20.

The user apparatus 30 may provide (e.g., via communication interface 36) the information regarding the trip such that the network apparatus 10 receives the information regarding the trip (e.g., via communication interface 16) and stores the information regarding the trip in a data store (e.g., database and/or the like in memory 14) corresponding to the user. The network apparatus 10 may then compile information regarding a plurality of trips taken by the user into user-specific training data. In various embodiments, the user-specific training data is formatted as labeled training data.

At block 308, the network apparatus 10 trains the pre-trained trip intent model using the user-specific training data. For example, the network apparatus 10 comprises means, such as processor 12, memory 14, and/or the like, for training the trip plan model using the user-specific training data. In various embodiments, the trip plan model is trained using various ANN, DNN, CNN, GAN, Bayesian classifier, clustering classifier, and/or other machine learning-trained model architectures and corresponding training techniques. In an example embodiment, the training step uses the same model architecture and training technique as used in the pre-training step. In an example embodiment, the training step uses a different model architecture and/or training technique than that used in the pre-training step. In various embodiments, the trip plan model is trained to a desired level of convergence, maximum number of training iterations, and/or the like.

In an example embodiment, the network apparatus 10 obtains the group pre-training data and pre-trains the trip intent model and the user apparatus 30 obtains the user-specific training data and trains a pre-trained trip intent model to generate and/or determine the user-specific trip intent model.

At block 310, the user-specific trip intent model is stored. In an example embodiment, the network apparatus 10 stores the user-specific trip intent model in memory 14. In an example embodiment, the network apparatus 10 provides the user-specific trip intent model (e.g., via communication interface 16) for receipt by the user apparatus 30. The user apparatus 30 receives the user-specific trip intent model (e.g., via communication interface 36) and stores the user-specific trip intent model to memory 34. The user-specific trip intent model may be used by a trip intent engine operating on the network apparatus 10 and/or user apparatus 30 to generate and/or determine trip plans for the user.

B. Example Use of a Trip Plan Engine

In various embodiments, a trip plan engine operating on a network apparatus 10 and/or a user apparatus 30 is used to generate and/or determine a trip plan. The trip plan is then provided to the user via the user apparatus 30 such that the user can conduct the trip in accordance with the trip plan.

FIG. 4 provides a flowchart illustrating various processes, procedures, operations, and/or the like for generating and/or determining a trip plan engine and providing guidance to a user to conduct the trip in accordance with the trip plan. The processes, procedures, and/or operations of FIG. 4 may be performed by the network apparatus 10 and/or user apparatus 30 in various embodiments.

Starting at block 402, a trip intent is obtained. For example, the user apparatus 30 receives user input via user interface 38 providing the trip intent, in an example embodiment. In an example embodiment, an application and/or the trip intent engine operating on the user apparatus 30 and/or network apparatus 10 infers, identifies, and/or determines a trip intent based on user actions, such as Internet browsing activity; Internet search queries; parsing social media messages, texts, or emails; based on previous user behavior (e.g., the user usually visits a grocery store on Wednesday, so Wednesday morning, the user apparatus 30 may infer that the user would like to make a trip to buy groceries that day); and/or the like. For example, the user apparatus 30 comprises means, such as processor 32, memory 24, user interface 38, and/or the like, for receiving user input providing a trip intent. In various embodiments, the user may type (e.g., using a soft or hardware keyboard) the trip intent. In various embodiments, the user may provide the trip intent via a voice command that is interpreted via a natural language processing engine of the user apparatus 30. For example, a user apparatus 30 may obtain a trip intent provided via user interaction with the user interface 38. In various embodiments a trip intent is an indication of one or more items and/or services a user wishes to obtain on a trip. In an example embodiment, the user may provide information regarding who is going on the trip (e.g., the user alone, the user and a friend, the user and a child, etc.) and this information may be provided along with the trip intent.

In an example embodiment, the user apparatus 30 provides (e.g., via communication interface 36) the trip intent such that a network apparatus 10 receives the trip intent. For example, the network apparatus 10 comprises means, such as processor 12, memory 14, communication interface 16, and/or the like, for obtaining a trip intent.

At block 404, a current location of the user is obtained. For example, the user apparatus 30 may determine its current location using a location sensor thereof. In another example, a user may provide the current location via the user interface 38. For example, the user apparatus 30 comprises means, such as processor 32, memory 34, user interface 38, sensors 39, and/or the like, for determining a current location of the user apparatus 30.

In an example embodiment, an origin location of a trip (which may or may not be the current location of the user apparatus 30) is obtained. For example, the user may interact with user interface 38 to provide an origin location of the trip.

In an example embodiment, the user apparatus 30 provides (e.g., via communication interface 36) the current location and/or origin location of the trip such that a network apparatus 10 receives the current location and/or origin location of the trip. For example, the network apparatus 10 comprises means, such as processor 12, memory 14, communication interface 16, and/or the like, for obtaining a current location and/or origin location of the trip.

At block 406, context information is obtained. For example, the user apparatus 30 and/or network apparatus 10 may request and/or receive context information from one or more context apparatuses 20. In various embodiments, the context information may include one or more of traffic data, weather data, driving conditions data, vehicle availability for one or more modes of transportation, parking availability for one or more modes of transportation at the destination, reservation availability, a time of day, a current season; and/or other information that may be relevant to the trip. For example, the user apparatus 30 and/or network apparatus 10 may comprise means, such as processor 12, 32, memory 14, 34, communication interface 16, 36, and/or the like, for requesting and/or receiving context information from one or more context apparatuses 20. For example, the user apparatus 30 and/or network apparatus 10 may communicate with a first context apparatus 20 to obtain weather data and communicate with a second context apparatus 20 to obtain traffic data. In various embodiments, the user apparatus 30 and/or network apparatus 10 may communicate with one or more context apparatuses 20 associated with reservable services to determine availability of such reservable services (e.g., shared vehicles, parking spots, appointments, and/or the like).

At block 408, the user apparatus 30 and/or network apparatus 10 executes a trip plan engine to generate a trip plan. For example, the user apparatus 30 and/or the network apparatus 10 comprises means, such as processor 12, 32, memory 14, 34, and/or the like, for executing a trip plan engine to generate a trip plan.

In various embodiments, the trip intent, information regarding who is going on the trip, the current location and/or original location of the trip, and the context information are provided as input to the trip plan engine. In various embodiments, the trip plane engine is able to access (e.g., via an application program interface (API) call and/or the like) a POI database comprising POI information. For example, the POI information corresponding to a POI may indicate the location of the POI, a type of POI (grocery store, ice cream store, gas station, public park, public library, etc.), hours the POI is open, one or more intents associated with the POI, and/or the like. In various embodiments, the trip plan engine is able to access (e.g., via an API call and/or the like) map data of a digital map representing at least a portion of a traversable network (e.g., road network and/or pedestrian/bike path/trail network).

To determine and/or generate the trip plan, a destination for the trip is determined. In various embodiments, the destination is determined based at least in part on the trip intent. For example, the POI database may be queried based on the trip intent to identify a POI within a maximum distance of the current location and/or origin location for the trip associated with the trip intent. In an example embodiment, two or more possible destinations for the trip are determined.

Based on the destination, current location and/or origin location of the trip, and context information, the machine learning-trained trip plan model is used to determine a route to the destination (e.g., starting from a user's current location or other origin location), timing information for the trip (e.g., a time for beginning the trip), one or more modes of transportation for use in traversing one or more portions of the route, and/or the like. In various embodiments, the trip plan model is further configured to, using the destination, current location and/or origin location of the trip, and context information as input, determine and/or generate a reservation plan for the trip plan. For example, the reservation plan may include a plan for a reservation for a vehicle (e.g., bicycle, cargo bicycle, passenger car, van, pick-up truck, moving truck, train, bus, and/or the like), a parking spot near the destination, an appointment for fulfilling the trip intent at the destination, and/or the like. For example, the trip plan engine may determine and/or identify a cargo requirement associated with and/or corresponding to the trip intent and identify one or more modes of transportation that provide cargo capabilities that are in accordance with the cargo requirement associated with and/or corresponding to the trip intent.

At block 410, the user apparatus 30 and/or network apparatus 10 causes at least a portion of the trip plan to be provided in a human perceivable manner via the user interface 38 of the user apparatus 30. For example, the network apparatus 10 may provide (e.g., via communication interface 16) the trip plan such that the user apparatus 30 receives the trip plan (e.g., via communication interface 36). The user apparatus 30 comprises means, such as processor 32, memory 34, user interface 38, and/or the like, for causing at least a portion of the trip plan to be provided via, for example, a speaker and/or display of and/or coupled to the user apparatus 30.

For example, in various embodiments, the user interface 38 displays information identifying the destination for the trip (e.g., POI name, POI address, and/or the like), displays a map illustrating a location of the destination for the trip and/or at least a portion of a route from the current location of the user apparatus and/or another origin location for the trip, a time for beginning the trip, information regarding the reservation plan (e.g., pick up location of reserved item, drop-off location of reserved item, time of reservation, reserved item or service, cost of reserving the item or service, and/or the like), and/or the like.

In various embodiments, the user interface 38 further displays a "Please make my reservation(s)" selectable element. The user may interact with the user interface 38 to select the "Please make my reservation(s)" selectable element. In another example embodiment, the user interface 38 may request an audible selection or approval of the reservation plan. For example, the user interface 38 may provide the user with an option to interact with the user interface 38 to provide user input selecting or approving the reservation plan. In various embodiments, a user may be able to interact with the user interface 38 to revise and/or edit the reservation plan.

At block 412, an indication of user input selecting and/or approving the reservation plan is received. For example, the user apparatus 30 receives user input selecting and/or approving the reservation plan. For example, the user apparatus 30 comprises means, such as processor 32, memory 34, user interface 38, and/or the like, for receiving user input selecting and/or approving the reservation plan. The user apparatus 30 may then provide an indication of the user input selecting and/or approving the reservation plan to the trip plan engine operating on the user apparatus 30 and/or on the network apparatus 10. For example, in an example embodiment, the user apparatus provides an indication of the user input selecting and/or approving the reservation plan (e.g., via communication interface 36) such that the network apparatus 10 receives the indication of the user input selecting and/or approving the reservation plan and provides the indication of the user input selecting and/or approving the reservation plan to the trip plan engine operating on the network apparatus 10. For example, the network apparatus 10 comprises means, such as processor 12, memory 14, communication interface 16, and/or the like, for receiving an indication of the user input selecting and/or approving the reservation plan and providing the indication of the user input selecting and/or approving the reservation plan to the trip plan engine operating thereon.

At block 414, the user apparatus 30 and/or network apparatus 10 communicates with one or more context apparatuses 20 operated by and/or on behalf of a reservable service provider and/or reservation apparatuses 40 to make one or more reservations in accordance with the reservation plan. For example, the user apparatus 30 and/or network apparatus 10 comprises means, such as processor 12, 32, memory 14, 34, communication interface 16, 36, and/or the like for communicating with one or more context apparatuses 20 operated by and/or on behalf of a reservable service provider and/or reservation apparatuses 40 to make one or more reservations in accordance with the reservation plan.

For example, a reservation may be made for a vehicle (e.g., automobile, passenger car, bicycle, cargo bicycle, pick up truck, van, moving truck, and/or the like) with a pick up time, pick up location, drop off time, drop off location, cost, and/or the like, in accordance with the reservation plan. In another example, a reservation may be made for a parking spot near the destination for the trip based on an expected time of arrival of the user at the destination and the mode of transportation associated with at least a portion of the trip. In another example, a reservation may be made for an appointment or other service at the destination based on the expected time of arrival (e.g., a dinner reservation, an electronics technician appointment, etc.).

In various embodiments, the user apparatus 30 and/or network apparatus 10 may receive confirmation of the reservation(s) made and/or credentials (e.g., a password, code, reservation id, and/or the like) required for using the reservation(s). In various embodiments, the confirmation of the reservation(s) and/or credentials required for using the reservation(s) are stored by the user apparatus 30 for use during the trip and/or provided to the user via the user interface 38 (e.g., a display or speaker of and/or coupled to the user apparatus 30).

At block 416, the user apparatus 30 and/or network apparatus 10 causes guidance for conducting the trip in accordance with the trip plan to be provided. For example, the guidance may be provided, at least in part by the user interface 38 of the user apparatus 30. For example, the user apparatus 30 and/or network apparatus 10 comprises means, such as processor 12, 32, memory 14, 34, communication interface 16, 36, user interface 38, and/or the like, for causing guidance for conducting the trip in accordance with the trip plan to be provided. For example, the user apparatus 30 may provide a notification to a user when it is time to begin a trip (or a fifteen minute, thirty minute, one hour and/or the like alert ahead of a time for beginning the trip), based on the trip plan. In another example, the user apparatus 30 may provide route guidance for traversing a route of the trip plan (e.g., to pick up a vehicle at a vehicle pick up location, to travel to the destination location) and/or the like. In another example, the user apparatus 30 may provide instructions for making use of a reservation (e.g., for accessing a reserved vehicle, accessing a reserved parking spot, accessing service reservation, and/or the like).

For example, the user apparatus 30 may be configured to guide the user along a route to a pickup location for a reserved vehicle 5A. In an example embodiment, a location sensor 39 may determine that the user apparatus 30 is located at the pickup location and/or a user may interact with the user interface 38 to indicate that the user is located at the pickup location. Once at the pickup location, the user apparatus 30 may communicate (e.g., directly and/or via one or more wired and/or wireless networks 50) with the corresponding reservation apparatus 40A to provide credentials enabling the user to access the reserved vehicle 5A. In another example, when at the pickup location, the user apparatus 30 may provide the credentials via the user interface 38 and the user may interact with a user interface of the reservation apparatus 40A to provide the credentials to enable the user to access the reserved vehicle 5A.

For example, the network apparatus 10 and/or user apparatus 30 may perform or cause performance of one or more navigation-related functions based at least in part on the trip plan to guide the user in conducting the trip. Some non-limiting examples of navigation-related functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, adjustment of one or more settings for sensors and/or one or more operational parameters of a vehicle, provide information corresponding to one or more reservations, communicate with one or more reservation apparatuses 40 to enable a user to access and/or make use of the corresponding reservation, and/or the like.

C. Technical Advantages

Conventional navigation aids are able to provide a user with a route from an origin location to a destination location. However, a user must already know the destination location and determine when and how to conduct the trip. However, the destination of the trip, the timing of the trip, and/or the mode of transportation used for the trip may be far from optimal. This may lead to the user wasting time, money, fuel, and/or the like. Moreover, if the user does not own a vehicle that has cargo capabilities that are in accordance with the cargo requirement associated with and/or corresponding to the trip intent, finding access to such a vehicle may be difficult. Conventional navigation aids generally do not address such problems. Therefore, a technical problem exists regarding the lack of ability and/or tools for determining and/or generating a trip plan for accomplishing one or more user goals.

Various embodiments provide technical solutions to these technical problems. In particular, a trip plan engine comprising a machine learning-trained trip plan model is configured to identify a destination, determine a route, determine a mode of transportation, determine travel timing, and/or the like based on a trip intent, user preferences and/or historical behavior, a POI database, and/or context information. Moreover, the trip plan engine may generate a reservation plan based on the trip plan which is configured to enable the user to conduct the trip in the planned manner.

Thus, various embodiments provide an improved user experience and improvements to the technical field of navigation-related technologies, such as trip planning.

IV. Example Apparatuses

The network apparatus 10, context apparatus 20, user apparatus 30, and/or reservation apparatus 40 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, context apparatus 20, user apparatus 30, and/or reservation apparatus 40 may be embodied in other types of computing devices, such as a server, a personal computer, a computer workstation, a laptop computer, a plurality of networked computing devices or the like, that are configured to update one or more map tiles, analyze instances of probe data for route planning or other purposes. In an example embodiment, network apparatus 10 is a server; a context apparatus 20 is a server and/or Cloud-based computing resource; a user apparatus 30 is a consumer mobile computing entity, such as a smartphone; and a reservation apparatus 40 is a computing configured to control access to an associated item or service; and/or the like.

In this regard, FIG. 2A depicts an example network apparatus 10, FIG. 2B depicts an example context apparatus 20, and FIG. 2C depicts an example user apparatus 30 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a context apparatus 20 of an example embodiment may include, may be associated with, or may otherwise be in communication with a processor 22 and a memory device 24 and optionally a communication interface 26, a user interface 28, and/or other components configured to perform various operations, procedures, functions, or the like described herein. Similarly, a user apparatus 30 of an example embodiment may include, may be associated with, or may otherwise be in communication with a processor 32 and a memory device 34 and optionally a communication interface 36, a user interface 38, one or more sensors 39 (e.g., a location sensor such as a GNSS sensor, IMU sensors, and/or the like; camera(s); radio sensors/interfaces), and/or other components configured to perform various operations, procedures, functions, or the like described herein. In various embodiments, a reservation apparatus 40 comprises one or more components similar to those of the user apparatus 30 (e.g., one or more processors, one or more memory devices, one or more communication interfaces, one or more user interfaces and/or sensors such as location (e.g., GNSS) sensors and/or radio sensors/interfaces).

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, context apparatus 20, user apparatus 30, and/or reservation apparatus 40 may be embodied by a computing device. However, in some embodiments, a respective apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, context apparatus 20, user apparatus 30, and/or reservation apparatus 40 may include a user interface 18, 28, 38 that may, in turn, be in communication with the processor 12, 22, 32 to provide output to the user, such as at least a portion of a trip plan, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34, and/or the like).

The network apparatus 10, context apparatus 20, user apparatus 30, and/or reservation apparatus 40 may optionally include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, context apparatus 20, user apparatus 30, and/or reservation apparatus 40 of an example embodiment, a navigation system may also include or have access to a geographic database that includes a variety of data (e.g., map information/data, at least a portion of a digital map representing at least a portion of the traversable network) utilized in constructing a route or navigation path, determining the time to traverse the route or navigation path, matching a geolocation (e.g., a GNSS determined location) to a point on a map, and/or link, and/or the like. For example, a geographic database may include lane data records, road segment or link data records, pedestrian and/or bike path segment data records, point of interest (POI) data records, and other data records. More, fewer or different data records can be provided. In one embodiment, the other data records include cartographic ("carto") data records, routing data, and maneuver data. One or more portions, components, areas, layers, features, text, and/or symbols of the POI data can be stored in, linked to, and/or associated with one or more of these data records. For example, one or more portions of the POI or recorded route information can be matched with respective map or geographic records via position or GNSS data associations (such as using known or future map matching or geo-coding techniques), for example. In an example embodiment, the data records may comprise nodes, connection information/data, intersection data records, link data records, lane data records, POI data records, and/or other data records.

In an example embodiment, the network apparatus 10 may be configured to modify, update, and/or the like one or more data records of the geographic database. For example, the network apparatus 10 may modify, update, and/or the like the digital map to include intents associated with various POIs, a localization layer and/or the corresponding data records, and/or the like.

In an example embodiment, the connection information/data and/or road, pedestrian, and/or bike path segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a traversable network, such as used by vehicles, cars, pedestrians, bicyclists, and/or other entities. Similarly, the nodes and connection information/data of the late lane change digital map represent a lane network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example.

Also, remote sensing, such as aerial or satellite photography, can be used. In an example embodiment, the geographic database (e.g., the late lane change digital map) may be generated and/or updated based on information/data provided by a plurality of non-dedicated probe apparatuses. For example, the probe apparatuses may be onboard vehicles owned and/or operated by and/or on behalf of members of the general public such that, for example, new drives used to generate and/or update the late lane change digital map may be crowdsourced.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, context apparatus 20, user apparatus 30, and/or reservation apparatus 40 in accordance with an example embodiment may determine the time to traverse a route that includes one or more turns at respective intersections more accurately.

V. Apparatus, Methods, and Computer Program Products

As described above, FIGS. 3 and 4 illustrate flowcharts of a present embodiment of FIG. 1, network apparatus 10, context apparatus 20, user apparatus 30, and/or reservation apparatus 40, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method performed by an apparatus, the method comprising:

obtaining, by a processor of the apparatus, at least in part by executing computer program instructions stored in a memory of the apparatus, a trip intent associated with a user;

obtaining, by the processor, context information corresponding to the trip intent, wherein the context information comprises one or more of parking availability for one or more modes of transportation at a destination, reservation availability, a time of day, or a current season;

causing, via execution of the computer program instructions by the processor, execution of a trip intent engine to determine a trip plan based at least in part on the trip intent and the context information using a trip plan model, wherein the trip intent engine comprises the trip plan model, the trip plan model is a machine learning-trained model providing one or more multi-feature criteria, and the trip plan is determined based at least in part by which of the one or more multi-feature criteria are satisfied by at least one of the trip intent and the context information, and wherein executing the trip intent engine causes:

determination of a cargo requirement corresponding to the trip intent;

determination of one or more modes of transportation for use in traversing one or more portions of a route corresponding to the trip intent based at least in part on respective cargo capabilities of the one or more modes of transportation and the cargo requirement;

identification of the destination based at least in part on results of querying a point of interest database and based at least in part on the trip intent;

determination of the route from a current location of the user to the destination based at least in part on data accessed from a geographic database, a respective mode of transportation of the one or more modes of transportation determined for a respective portion of the route, and the context information;

determination of a time for beginning a trip to the destination based at least in part on data accessed from the geographic database and the context information; and determination of a reservation plan based on at least one of the route, the destination, the one or more modes of transportation, the time for beginning the trip to the destination, or the context information, wherein the reservation plan comprises indications of what is reserved in a reservation of the reservation plan, a location at which to access the reservation, and a timing of the reservation;

causing, via execution of the computer program instructions by the processor, at least a portion of the trip plan to be provided to the user via a user interface of a user apparatus; and causing, via execution of the computer program instructions by the processor, the user apparatus to communicate with a reservation apparatus corresponding to the reservation of the reservation plan of the trip plan responsive to a location sensor of the user apparatus determining that the user apparatus is at a location corresponding to the reservation, wherein the user apparatus communicates credentials configured for receipt by the reservation apparatus to enable the user to access the reservation.

2. The method of claim 1, further comprising obtaining the current location of the user, the current location determined based at least in part on the location sensor of the user apparatus.

3. The method of claim 1, wherein the context information further comprises one or more of traffic data, weather data, driving conditions data, or vehicle availability for the one or more modes of transportation.

4. The method of claim 3, wherein the trip intent engine is configured to determine the trip plan based at least in part on the context information satisfying at least one of the one or more multi-feature criteria.

5. The method of claim 1, wherein the trip intent comprises one or more items, services, or experiences the user would like to obtain.

6. The method of claim 1, wherein the trip plan model is at least one of a user-specific model, a location-specific model, or a user demographic-specific model.

7. The method of claim 1, wherein the trip intent is determined based at least on user input received by the user apparatus.

8. The method of claim 1, wherein the point of interest database comprises point of interest data associated with intent data.

9. The method of claim 1, further comprising reserving at least one of a vehicle, a parking spot, or service based on the reservation plan.

10. The method of claim 1, further comprising causing the user interface of the user apparatus to provide guidance for completing at least a portion of the trip in accordance with the trip plan based at least in part on a location of the user apparatus as determined by the location sensor of the user apparatus.

11. The method of claim 1, wherein the credentials comprise one or more of a password, a code, or a reservation ID configured to enable the user to access the reservation.

12. An apparatus comprising at least one processor and at least one memory storing computer program code, the at least one memory and the computer program code configured to, with the processor, cause the apparatus to at least:

obtain a trip intent associated with a user;

obtain context information corresponding to the trip intent, wherein the context information comprises one or more of parking availability for one or more modes of transportation at a destination, reservation availability, a time of day, or a current season;

cause execution of a trip intent engine to determine a trip plan based at least in part on the trip intent and the context information using a trip plan model, wherein the trip intent engine comprises the trip plan model, the trip plan model is a machine learning-trained model providing one or more multi-feature criteria, and the trip plan is determined based at least in part by which of the one or more multi-feature criteria are satisfied by at least one of the trip intent and the context information, and, wherein execution of the trip intent engine causes:

determination of a cargo requirement corresponding to the trip intent;

determination of one or more modes of transportation for use in traversing one or more portions of a route corresponding to the trip intent based at least in part on respective cargo capabilities of the one or more modes of transportation and the cargo requirement;

identification of the destination based at least in part on results of querying a point of interest database based at least in part on the trip intent;

determination of the route from a current location of the user to the destination based at least in part on data accessed from a geographic database, a respective mode of transportation of the one or more modes of transportation determined for a respective portion of the route, and the context information;

determination of a time for beginning a trip to the destination based at least in part on data accessed from the geographic database and the context information; and determination of a reservation plan based on at least one of the route, the destination, the one or more modes of transportation, the time for beginning the trip to the destination, or the context information, wherein the reservation plan comprises indications of what is reserved in a reservation of the reservation plan, a location at which to access the reservation, and a timing of the reservation;

cause at least a portion of the trip plan to be provided to the user via a user interface of a user apparatus; and cause the user apparatus to communicate with a reservation apparatus corresponding to the reservation of the reservation plan of the trip plan responsive to a location sensor of the user apparatus determining that the user apparatus is at a location corresponding to the reservation, wherein the user apparatus communicates credentials configured for receipt by the reservation apparatus to enable the user to access the reservation.

13. The apparatus of claim 12, wherein the at least one memory and the computer program code are further configured to, with the processor, cause the apparatus to at least obtain the current location of the user, the current location determined based at least in part on the location sensor of the user apparatus.

14. The apparatus of claim 12, wherein the context information further comprises one or more of traffic data, weather data, driving conditions data, or vehicle availability for the one or more modes of transportation.

15. The apparatus of claim 14, wherein the trip intent engine is configured to determine the trip plan based at least in part on the context information satisfying at least one of the one or more multi-feature criteria.

16. The apparatus of claim 12, wherein the trip intent comprises one or more items, services, or experiences the user would like to obtain.

17. The apparatus of claim 12, wherein the trip plan model is at least one of a user-specific model, a location-specific model, or a user demographic-specific model.

18. The apparatus of claim 12, wherein the trip intent is determined based at least on user input received by the user apparatus.

19. The apparatus of claim 12, wherein the point of interest database comprises point of interest data associated with intent data.

20. The apparatus of claim 12, wherein the at least one memory and the computer program code are further configured to, with the processor, cause the apparatus to at least reserve at least one of a vehicle, a parking spot, or service based on the reservation plan.

* * * * *